March 17, 1959
F. K. CAMPBELL
2,878,391
URANIUM DETECTING DEVICES
Filed April 4, 1955
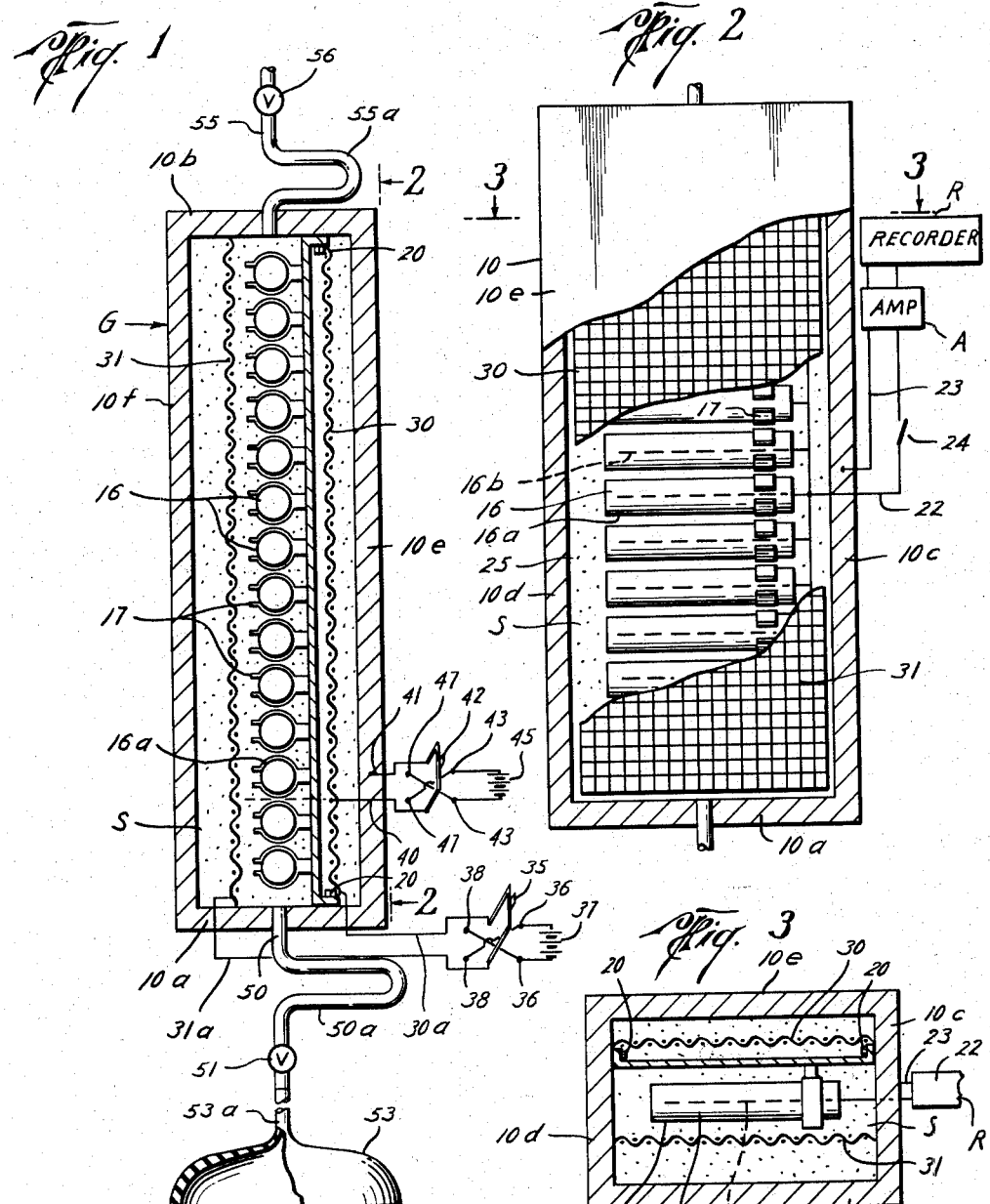
Francis K. Campbell
INVENTOR.
BY J. Vincent Martin
Joe E. Edwards
B. R. Pravel
ATTORNEYS

United States Patent Office 2,878,391
Patented Mar. 17, 1959

2,878,391

URANIUM DETECTING DEVICES

Francis K. Campbell, Houston, Tex., assignor, by mesne assignments, of one-half to Francis K. Campbell, Houston, Tex., and one-half to The Moran Corporation, Houston, Tex., a corporation of Delaware Application April 4, 1955, Serial No. 499,088

10 Claims. (Cl. 250—83.6)

This invention relates to new and useful improvements in uranium detecting devices.

As is known, during the disintegration or decay of uranium, many disintegration products are formed, from which alpha, beta and gamma rays, as well as radioactive gases are emitted. When the uranium is in equilibrium as an ore at its source, the alpha, beta and gamma rays are emitted, along with radioactive gases, in equilibrium. In my copending United States patent application, Serial No. 499,035, filed of even date herewith, a device is illustrated and described for determining the ratio of the alpha, beta and gamma ray radiation from uranium ore so as to determine whether the uranium is in equilibrium. The device of this invention is adapted to be used alone for detecting uranium by analyzing the radioactive gases emitted from uranium ore, but this device is particularly adapted to be used in conjunction with the device set forth in said copending patent application.

An object of this invention is to provide a new and improved uranium detecting device for obtaining a separate indication as to the presence and intensity of the radioactive gases from the uranium ore.

An important object of this invention is to provide a new and improved means for detecting uranium ore wherein the intensities of the alpha and beta rays in the radioactive gases from uranium ore are determined separately from the alpha, beta and gamma rays normally emitted from uranium ore.

Another object of this invention is to provide a new and improved device for obtaining an indication as to the relative proportions of alpha and beta rays in radioactive gases so that an indication is obtained as to whether or not such radioactive gases are emitted from a uranium ore.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a view, partly in elevation and partly in section, of the device of this invention;

Figure 2 is a sectional view taken on line 2—2 of Figure 1;

Figure 3 is a sectional view taken on line 3—3 of Figure 2; and

Figure 4 is an elevation, partly in section, of a modified form of the device of Figures 1–3.

In the drawings, the letter G designates generally the new and improved detector device of this invention, which, together with the amplifier A and the recorder or indicator R, constitutes a new and improved "Geiger" type device for detecting uranium ore. As will be explained, the detector device G of this invention can be selectively manipulated so as to obtain records or indications on said recorder or indicator R which are indicative of the comparative intensities of the alpha and beta rays present in the radioactive gas emitted from uranium ore, whereby the location of uranium ore is facilitated.

Considering now the details of the specific embodiment of the detector device G illustrated in Figures 1–3 of the drawings, such device G includes a housing or receptacle 10 which is formed of lead or any other material through which alpha, beta and gamma rays do not pass. The housing or receptacle 10 may be formed in any suitable shape and as illustrated in the drawings, it is substantially rectangular and completely encloses a space S by the end sections 10a and 10b, sides 10c and 10d and top 10e and bottom 10f. Although such housing or receptacle 10 is illustrated as an integral unit with all of the sides, ends and top and bottom thereof formed together, it will be readily appreciated that such housing or receptacle 10 would preferably have one portion thereof removable for the assembly or disassembly purposes.

Within the space S, a plurality of detector tubes 16 are mounted in any suitable manner. As illustrated, the tubes 16 are each held in substantially the mid portion of the enclosed space S by a clamp 17 of resilient metal or other material which is secured to the housing or receptacle 10 by a support plate 19 which is preferably formed of an insulating material which is electrically non-conductive. Thus, with the insulating plate 19 having connection with the ends 10a and 10b by means of screws 20 or any other suitable securing means, there is no electrical circuit from the detector tubes 16 to the housing or receptacle 10. The detector tubes 16 are of any standard type used in "Geiger" type devices for detecting uranium ore and each of which has a metal cylindrical exterior 16a and an anode 16b centrally disposed within each of the tubes 16. Such detector tubes 16 are known as bismuth tubes, an example of which is sold under the trade name "Victoreen No. 6306." The tubes 16 are electrically connected in parallel (Figure 2) so that a common electrical wire 22 is connected to all of the anodes 16b of the tubes 16. A parallel wire 23 is grounded by connecting same to the housing 10. The wires 22 and 23 lead from the detector device G to the amplifier A (shown in a reduced size) and then to the recorder or indicator R is preferably of the type which indicates the electric current detected in the tubes in milliamperes, but any other standard type or recorder or indicator can be utilized. A switch 24 may be provided if desired in order to open and close the circuit to the amplifier A and the recorder or indicator R, when desired.

A quantity of charcoal 25 is preferably disposed within the annular space S for surrounding the detectors and is insulated from the detectors and housing by an insulation material covering on the detectors and on the inside of the housing but the charcoal is in contact with screen 31. The charcoal 25 is in a finely divided or powdered condition and such charcoal serves to readily absorb the radon or radioactive gas from the uranium ore, as will be more evident hereinafter. Although the charcoal serves to increase the intensity of the detection of the rays which are present in the radon or radioactive gas from the uranium ore, such charcoal can be omitted while still accomplishing substantially the same result.

Within the confined space S above the detector tubes 16 (Figure 3) an upper screen or grid 30 is positioned. A similar screen or grid 31 is positioned in the charcoal 25 within the space S and below the detector tubes 16. The screens 30 and 31 are provided with suitable insulation to prevent electrical contact with the housing or receptacle 10. However, only the screen 30 is completely covered with an insulation material to prevent electrical contact by the charcoal 25, but screen 31 is not insulated from the charcoal. An electrical wire 30a is connected with the screen 30 (Figure 1) and extends through the end 10a of the receptacle 10. A similar electrical wire 31a leads from the screen 31 through the end 10a of receptacle 10, with the outer ends of the wires 30a and 31a having connection with a two-way throw switch 35. The switch 35 is adapted to engage electrical contacts 36 to establish a voltage from the battery 37 across the screens 30 and 31, with the screen 31 being positive and the screen 30 being negative. The battery 37 is a direct current source and of course may be of any known type of dry cell or wet cell construction, as well as any other type of direct current generator. When the switch 35 is thrown in the other direction for contact with the electrical contacts 38, then the polarity on the screens 30 and 31 is reversed so that the screen 30 is then positive and the screen 31 is negative. It will be appreciated, of course, that any other suitable type of switch which is capable of reversing the polarity on the screens 30 and 31 from a direct current source 37 can be substituted in place of the particular switch 35 illustrated in Figure 3 of the drawings.

Another electrical arrangement is also provided for obtaining a separate indication as to the alpha and beta rays in the radioactive gases. Such arrangement includes an electrical wire 40 which is connected to both of the screens 30 and 31 and a second electrical wire 41 which is connected to the housing 10 and is interconnected with the wire 40 through a two-way switch 42. When such switch 42 is moved into electrical engagement with electric contacts 43, direct current from the battery 45 flows to render the housing 10 negative and the screens 30 and 31 positive. Upon moving the switch 42 into electrical engagement with the electric contacts 47, the polarity is reversed so that the housing 10 becomes positive and the screens 30 and 31 become negative.

On the end 10a of the receptacle 10, a metallic tube 50 is mounted for establishing communication between the interior space S and the area exterior of the receptacle 10. Such tube 50 is hollow and is preferably formed of lead to prevent the passage into the interior S of the rays from uranium ore other than those rays carried in the radioactive gases. Thus, the tube 50 has a valve 51 therewith for opening and closing flow through the tube 50, and the outer end of the tube 50 has a large cup 53 connected therewith, such cup 53 being formed of rubber or other similar flexible material to permit the movement of such cup 53 relative to the relatively rigid tube 50. The connecting hose 53a on the cup 53 fits around the tube 50 at its outer end so that gases which are collected within the cup 53 are directed through the hose 53a and then through the tube 50 into the interior space A of the device G. In order to increase the rate at which the gases flow into the space S after being directed thereto with the cup 53, a pipe 55 is mounted on the other end 10b of the housing or receptacle 10 for establishing a good communication from the interior space S to the exterior of receptacle 10 so that a vacuum pump or other means (not shown) for reducing the pressure within the space S can be connected thereto. A valve 56 may be provided if desired for opening and closing the connection to the vacuum pump or other similar means. Thus, with the vacuum pump in operation, the detector device G is especially adapted for collecting radioactive gas within the space S by a movement of the cup 53 over the area being investigated. In some cases, a pump can be connected in the pipe 50 to force the air through the receptacle 10 instead of using the vacuum pump on the pipe 55.

In the operation or use of the detector device G illustrated in Figures 1–3 of the drawings, the uranium ore is initially detected by moving the detector device G along with the amplifier A and the recorder or indicator R over the area being investigated. Such equipment can be carried in a truck or car or by any other suitable means so that a relatively large area can be inspected fairly rapidly. A partial vacuum is maintained within the space S, in the usual case by the vacuum pump (not shown) which is connected to the pipe 55 so that the air or other gases are drawn in through the cup 53 and through the housing 10. Due to the fact that the radiation of the alpha, beta and gamma rays from the uranium ore do not pass into the interior space S directly through the lead housing 10, all of the indication on the recorder or indicator R from the detector tubes 16 is a result of the rays present in the radioactive gases which are drawn into the space S. The U-shaped bend 50a of the tube 50 and the similar bend 55a in the pipe 55 prevent the gamma rays from passing into the housing 10 through the tube 50 or the pipe 55, respectively. Thus, with respect to any radioactive gases which may be drawn into the housing 10 with the air, only the alpha and beta rays are present.

In order to obtain an indication as to the intensity of the radioactive gases which have been drawn into the housing 10 so as to obtain an indication of the total intensity of both the alpha and beta rays therewith, the air is drawn into the housing 10 when the switch 35 is closed in contact with the electric contacts 38 so as to render the screen 30 positive and the screen 31 negative. At such time, the switch 42 is in an open position and is out of contact with both the electric contacts 43 and 47. Due to the positive charge on the screen 30 and the negative charge on the screen 31, the alpha particles would be attracted to the screen 31 and the beta particles or rays would be attracted to the screen 30. Thus, as the air is pulled or drawn through the housing 10, the alpha and beta rays or particles of the radioactive gases are accumulated on the screens 30 and 31. Thereafter, the polarity of the electrical charge on the screens 30 and 31 is reversed so as to render the screen 30 negative and the screen 31 positive. Such reversal of the polarity causes the alpha particles to travel from the screen 31 toward the screen 30 and the beta particles or rays to travel from the screen 30 toward the screen 31. During such exchange of the particles with respect to the screens 30 and 31, the gas in the detector tubes 16 is ionized in the conventional manner and the intensity so detected is amplified by the amplifier A and indicated or recorded on the recorder R. The cup 53 is ordinarily directed toward the area from which the wind is blowing. By determining the wind direction and the velocity when a high reading is obtained on the recorder R, the direction and distance of the uranium ore from the device of this invention can be determined. The modified device of Figure 4 shows cup 153 mounted in a bearing 80 on a support 81 such as the top of an automobile. The cup 153 has a wind vane 82 connected therewith so that the cup 153 is always directed toward the wind.

When it is desired to determine the proportionate intensities of the alpha and beta rays or particles in the radioactive gas being moved or drawn through the housing 10, the switch 35 is opened and the switch 42 is closed. With the switch 42 in electrical engagement with the electric contacts 47, the screens 30 and 31 are negative and the housing 10 is positive. Under such conditions, the beta particles would be attracted to the lead housing 10 on the interior thereof and the alpha particles would be rejected by the lead housing and would be attracted by the screens 30 and 31. During such collection of the alpha particles on the screens 30 and 31, they would be in the vicinity of the detector tubes 16 and would ionize the gas therein to give an indication on the recorder R of the intensity of the alpha rays or particles.

In order to obtain a separate indication as to the intensity of the beta rays or particles, the polarity of the screens 30 and 31, as well as the housing 10, is reversed so that the screens 30 and 31 become positive and the housing 10 becomes negative. Such a reversing of the polarity is accomplished by moving the switch 42 out of engagement with the electric contacts 47 and into engagement with the electric contacts 43. With the polarity thus reversed, the alpha particles would be attracted to the lead housing 10 and the beta particles would be rejected by the lead housing 10 and attracted by the screens 30 and 31, and in so doing would ionize the gas in the detector tubes 16 so as to give an indication of the intensity of the beta particles on the indicator or recorder R.

Thus, it is believed evident that this device of the invention provides a means for obtaining an indication as to the total intensity of the alpha and beta particles or rays in the radioactive gases emitted from uranium ore, and also a separate indication is obtained with respect to the alpha and the beta rays in the radioactive gases which are moved through the housing of the device. It should be noted that by determining the ratio of the alpha and beta rays or particles in the radioactive gases, the ratio is an indication as to the particular material which is emitting the radioactive gases and thereby such information serves to facilitate the location of uranium ore by distinguishing the detection of the radioactive gases from the indication which would be obtained from other ores or materials than the uranium ore.

The foregoing disclosure and the description of the invention is illustrative and explanatory thereof and various changes in the size, shape and materials, as well as in the details of the illustrated construction, may be made within the scope of the appended claims without departing from the spirit of the invention.

What is claimed is:

1. A device for detecting uranium ore by analyzing radioactive gases therefrom, comprising a housing formed of a material through which alpha, beta and gamma rays do not pass, an inlet tube at one end of said housing to provide for the inlet of gases into said housing, an outlet tube at the other end of said housing for the gases to pass outwardly from the interior of the housing, detector tubes within said housing for detecting the radiation from the alpha and beta rays in the gases passing through said housing from said inlet tube to said outlet tube, means in said housing for collecting the alpha rays in the gases passing through the interior of the housing, and other means in said housing for collecting the beta rays in the gases passing through the interior of the housing, and means for releasing said alpha and beta rays from the means for collecting same in the vicinity of said detector tubes for detection thereby.

2. The structure set forth in claim 1, including an indicator electrically connected to said detector tubes for indicating the intensity of the radiation of the rays detected by said detector tubes.

3. The structure set forth in claim 1, including means connected to said outlet tube for creating a partial vacuum within said housing to facilitate the drawing of air or other gas through said housing.

4. The structure set forth in claim 1, wherein each of said tubes is formed of a material through which alpha, beta and gamma rays do not pass, and wherein each tube has means therewith for preventing the entry of gamma rays into the interior of said housing with the gases.

5. The structure set forth in claim 1, wherein each of said tubes is made of lead to prevent radiated alpha, beta and gamma rays from passing into the interior of the housing, and wherein each tube has a bend therein to prevent the entry of gamma rays into the interior of the housing with the gases admitted through the inlet tube.

6. A device for detecting uranium ore by analyzing radioactive gases therefrom, comprising a housing formed of a material through which alpha, beta and gamma rays do not pass, an inlet tube at one end of said housing to provide for the inlet of gases into said housing, an outlet tube at the other end of said housing for the gasses to pass outwardly from the interior of the housing, detector tubes within said housing for detecting the radiation from the alpha and beta rays in the gases passing through said housing, a first screen disposed within said housing on one side of said detector tubes, a second screen disposed within said housing on the other side of said detector tubes, means for applying a negative charge to said first screen to collect alpha rays thereon from said gases, means for simultaneously applying a positive charge to said second screen to collect beta rays thereon from said gases, and means for reversing the polarity of the charges on said screens to release the alpha and beta particles therefrom and cause them to move into the vicinity of said detector tubes for detection thereby.

7. A device for detecting uranium ore by analyzing radioactive gases therefrom, comprising a housing formed of a material through which alpha, beta and gamma rays do not pass, an inlet tube at one end of said housing to provide for the inlet of gases into said housing, an outlet tube at the other end of said housing for the gases to pass outwardly from the interior of the housing, detector tubes within said housing for detecting the radiation from the alpha and beta rays in the gases passing through said housing, a first screen disposed within said housing on one side of said detector tubes, a second screen disposed within said housing on the other side of said detector tubes, means for applying a positive charge to the housing for collecting the beta rays thereon from the gases passing through the housing, and means for simultaneously applying a negative charge to both of said screens to accumulate the alpha rays from said gases between said screens and in the vicinity of said detector tubes whereby an indication as to the intensity of the alpha rays alone is obtained.

8. The structure set forth in claim 7, including means for reversing the polarity of the charge on the housing and the screens so as to accumulate the beta rays between the screens, whereby an indication as to the intensity of the beta rays alone in the gas is obtained.

9. The structure set forth in claim 6, including means for applying a positive charge to the housing, and means for simultaneously applying a negative charge to both of said screens to accumulate the alpha rays from said gases between said screens and in the vicinity of said detector tubes whereby an indication as to the intensity of the alpha rays alone is obtained.

10. The structure set forth in claim 6, including means for applying a positive charge to the housing, means for simultaneously applying a negative charge to both of said screens to accumulate the alpha rays from said gases between said screens and in the vicinity of said detector tubes, and means for reversing the polarity of the charge on the housing and the screens so as to thereafter accumulate the beta rays between the screens and in the vicinity of said detector tubes for obtaining an indication as to the intensity of the beta rays alone in the gas.

References Cited in the file of this patent

UNITED STATES PATENTS

| | | |
|---|---|---|
| 2,557,158 | Teichmann | June 19, 1951 |
| 2,602,904 | Simpson | July 8, 1952 |
| 2,625,657 | Kanne | Jan. 13, 1953 |
| 2,666,865 | Borkowski | Jan. 19, 1954 |